US010165518B2

(12) United States Patent
Park et al.

(10) Patent No.: US 10,165,518 B2
(45) Date of Patent: Dec. 25, 2018

(54) METHOD FOR CONTROLLING TRANSMISSION POWER OF SOUNDING REFERENCE SIGNAL AND APPARATUS FOR SAME

(71) Applicant: LG ELECTRONICS INC., Seoul (KR)

(72) Inventors: Jonghyun Park, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 245 days.

(21) Appl. No.: 14/895,437

(22) PCT Filed: Jun. 23, 2014

(86) PCT No.: PCT/KR2014/005514
§ 371 (c)(1),
(2) Date: Dec. 2, 2015

(87) PCT Pub. No.: WO2014/208951
PCT Pub. Date: Dec. 31, 2014

(65) Prior Publication Data
US 2016/0112960 A1    Apr. 21, 2016

Related U.S. Application Data

(60) Provisional application No. 61/838,849, filed on Jun. 24, 2013, provisional application No. 61/842,369, (Continued)

(51) Int. Cl.
*H04L 5/00* (2006.01)
*H04W 52/54* (2009.01)
(Continued)

(52) U.S. Cl.
CPC ......... *H04W 52/146* (2013.01); *H04L 5/0048* (2013.01); *H04W 52/325* (2013.01); *H04W 52/545* (2013.01); *H04B 7/2656* (2013.01)

(58) Field of Classification Search
CPC .. H04B 7/2656; H04L 5/0048; H04W 52/146; H04W 52/325; H04W 52/545
See application file for complete search history.

(56) References Cited

U.S. PATENT DOCUMENTS

2011/0268028 A1* 11/2011 Stern-Berkowitz .......................... H04L 5/0048
370/328
2012/0106471 A1    5/2012 Behravan et al.
(Continued)

FOREIGN PATENT DOCUMENTS

JP    2013-520862 A    6/2013
KR    10-2011-0134262 A    12/2011
(Continued)

*Primary Examiner* — Andrew Lai
*Assistant Examiner* — M Mostazir Rahman
(74) *Attorney, Agent, or Firm* — Birch, Stewart, Kolasch & Birch, LLP

(57) ABSTRACT

Disclosed in the present application is a method for transmitting a sounding reference signal (SRS) from a terminal to a base station in a wireless communication system. More specifically, the method comprises a step of establishing a first subframe set and a second subframe set through an upper layer; a step of receiving, from the base station, a triggering indicator of the sounding reference signal; and a step of transmitting the sounding reference signal from a specific subframe to the base station, according to the triggering indicator, wherein each of the first subframe set and the second subframe set is associated with a power control process for transmitting an uplink data channel, and wherein the transmission power of the sounding reference
(Continued)

signal is determined according to the bit size and/or the field value of the triggering indicator.

4 Claims, 10 Drawing Sheets

Related U.S. Application Data filed on Jul. 2, 2013, provisional application No. 61/894,396, filed on Oct. 22, 2013, provisional application No. 61/897,210, filed on Oct. 29, 2013.

(51) Int. Cl.
*H04W 52/14* (2009.01)
*H04W 52/32* (2009.01)
*H04B 7/26* (2006.01)

(56) References Cited

U.S. PATENT DOCUMENTS

| | | | |
|---|---|---|---|
| 2012/0300743 A1 | 11/2012 | Kim et al. | |
| 2013/0121279 A1 | 5/2013 | Noh et al. | |
| 2014/0161003 A1* | 6/2014 | Han | H04W 52/146 |
| | | | 370/280 |

FOREIGN PATENT DOCUMENTS

| | | |
|---|---|---|
| KR | 10-2012-0109502 A | 10/2012 |
| KR | 10-2013-0019415 A | 2/2013 |

* cited by examiner

FIG. 2
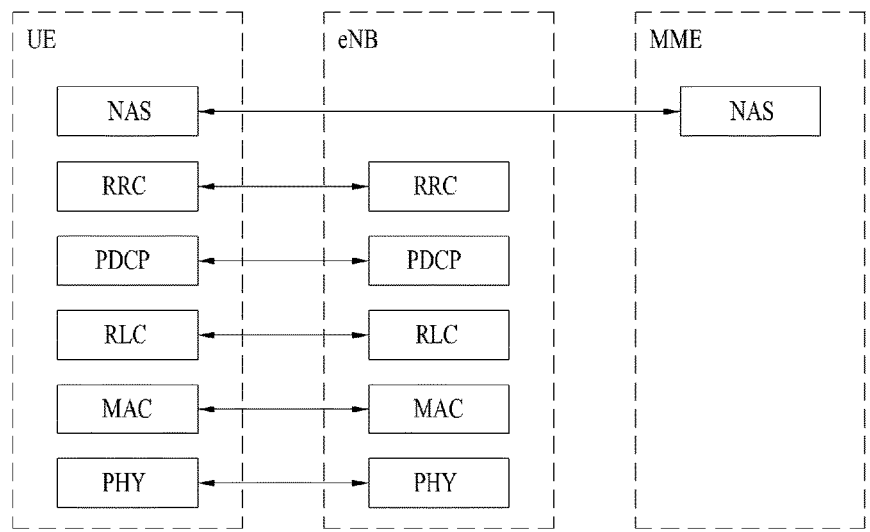
(a) control-plane protocol stack
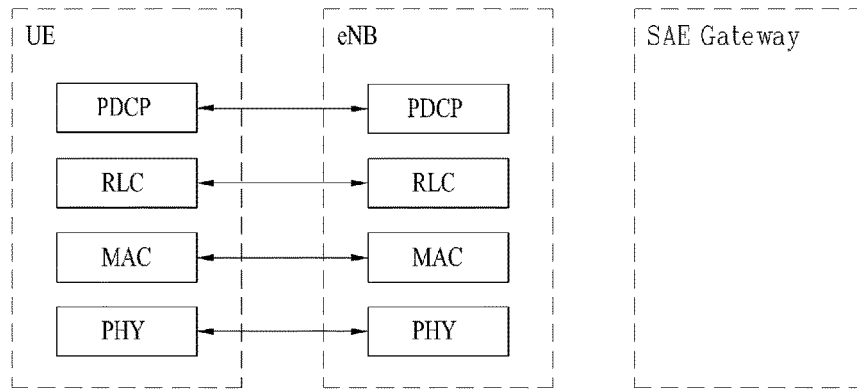
(b) user-plane protocol stack

METHOD FOR CONTROLLING TRANSMISSION POWER OF SOUNDING REFERENCE SIGNAL AND APPARATUS FOR SAME

CROSS REFERENCE TO RELATED APPLICATIONS

This application is the National Phase of PCT International Application No. PCT/KR2014/005514, filed on Jun. 23, 2014, which claims priority under 35 U.S.C. 119(e) to U.S. Provisional Application Nos. 61/838,849 filed on Jun. 24, 2013, 61/842,369 filed on Jul. 2, 2013, 61/894,396 filed on Oct. 22, 2013, and 61/897,210 filed on Oct. 29, 2013, all of which are hereby expressly incorporated by reference into the present application.

TECHNICAL FIELD

The present invention relates to a wireless communication system, and more particularly, to a method for controlling a transmission power of a sounding reference signal in a wireless communication system and an apparatus for the same.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

Based on the aforementioned discussion, hereinafter, an object of the present invention is to provide a method for controlling a transmission power of a sounding reference signal in a wireless communication system and an apparatus for the same.

Technical Solution

To achieve these objects and other advantages and in accordance with the purpose of the invention, a method for enabling a user equipment to transmit a sounding reference signal (SRS) to a base station in a wireless communication system, the method comprising: configuring a first subframe set and a second subframe set through a higher layer; receiving, from the base station, a triggering indicator of the sounding reference signal; and transmitting the sounding reference signal to the base station at a specific subframe to the base station in accordance with the triggering indicator, wherein each of the first subframe set and the second subframe set is associated with a power control process for uplink data channel transmission, and a transmission power of the sounding reference signal is determined in accordance with at least one of a bit size and a field value of the triggering indicator.

In another aspect of the present invention, if the bit size of the triggering indicator is 2 bits or more and the field value is 1, the transmission power of the sounding reference signal is determined based on a power control process associated with one of the first subframe set and the second subframe set, to which the specific subframe belongs.

In another aspect of the present invention, if the bit size of the triggering indicator is 2 bits or more and the field value is 2, the transmission power of the sounding reference signal is determined based on one of a power control process for uplink data channel transmission associated with the first subframe set and a power control process for uplink data channel transmission, which is associated with the second subframe set.

In another aspect of the present invention, the method further comprising: designating the one power control process through the higher layer.

In another aspect of the present invention, if the bit size of the triggering indicator is 1 bit, the transmission power of the sounding reference signal is determined based on a power control process associated with one of the first subframe set and the second subframe set, to which the specific subframe belongs.

In another aspect of the present invention, the first subframe set is a set of subframes fixed for an uplink, and the second subframe set is a set of subframes that may be used for one of an uplink and a downlink in accordance with indication of the base station.

Advantageous Effects

According to the embodiment of the present invention, a UE can efficiently control a transmission power of a sounding reference signal in a wireless communication system.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 2 is a diagram illustrating structures of a control plane and a user plane of a radio interface protocol between a user equipment and an E-UTRAN based on the 3GPP radio access network standard;

BEST MODE FOR CARRYING OUT THE INVENTION

Figure 1:
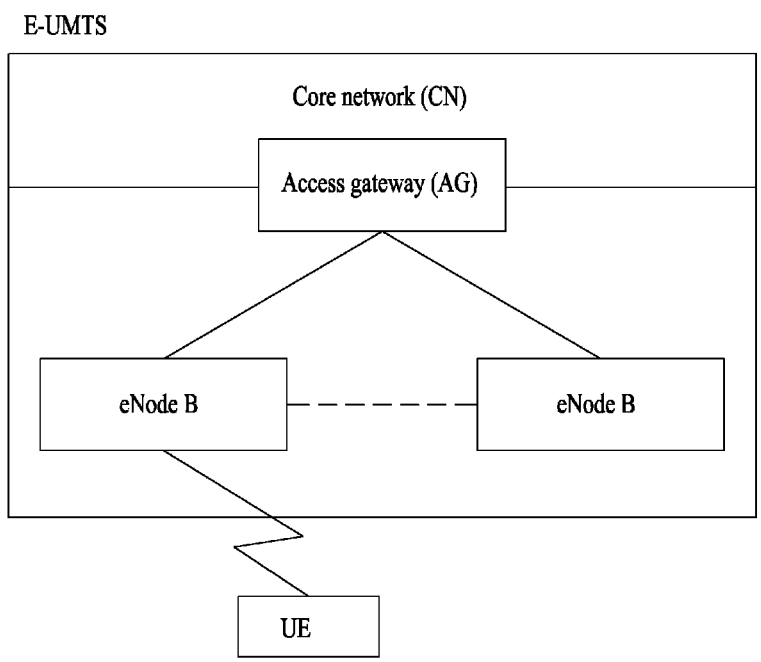
FIG. 1 is a diagram illustrating a network structure of an Evolved Universal Mobile Telecommunications System (E-UMTS), which is an example of a wireless communication system.

Hereinafter, configurations, operations, and other features of the present invention will be understood readily by the preferred embodiments of the present invention, examples of which are illustrated in the accompanying drawings. Embodiments described hereinafter are examples in which technical features of the present invention are applied to a 3GPP system.

Although the embodiment of the present invention will be described based on the LTE system and the LTE-A system in this specification, the LTE system and the LTE-A system are only exemplary, and the embodiment of the present invention may be applied to all communication systems corresponding to the aforementioned definition. Also, in this specification, a base station is used as a comprehensive terminology that includes a remote radio head (RRH), a transmission point (TP), a reception point (RP), eNB, a relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

One cell constituting a base station (eNB) is configured to use one of bandwidths of 1.4, 3, 5, 10, 15, and 20 MHz to provide a downlink (DL) or uplink (UL) transmission service to multiple UEs. Different cells may be configured to provide different bandwidths.

As downlink transport channels carrying data from a network to a user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
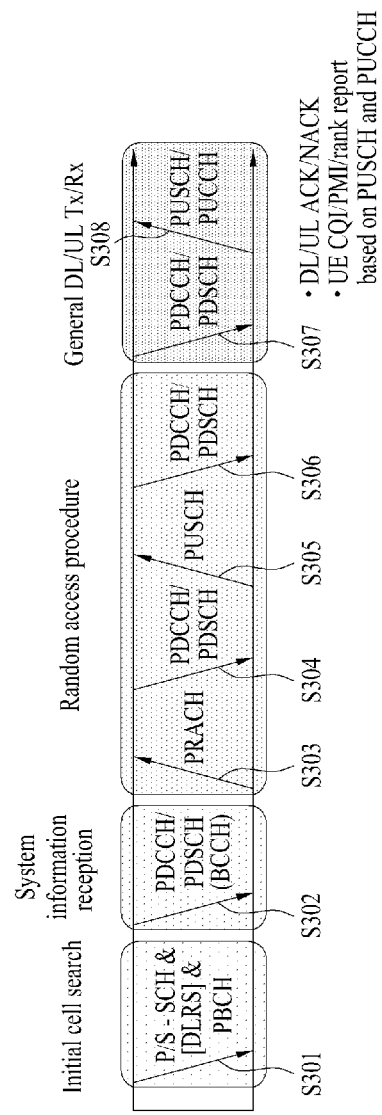
FIG. 3 is a diagram illustrating physical channels used in a 3GPP LTE system and a general method for transmitting a signal using the physical channels.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PDCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
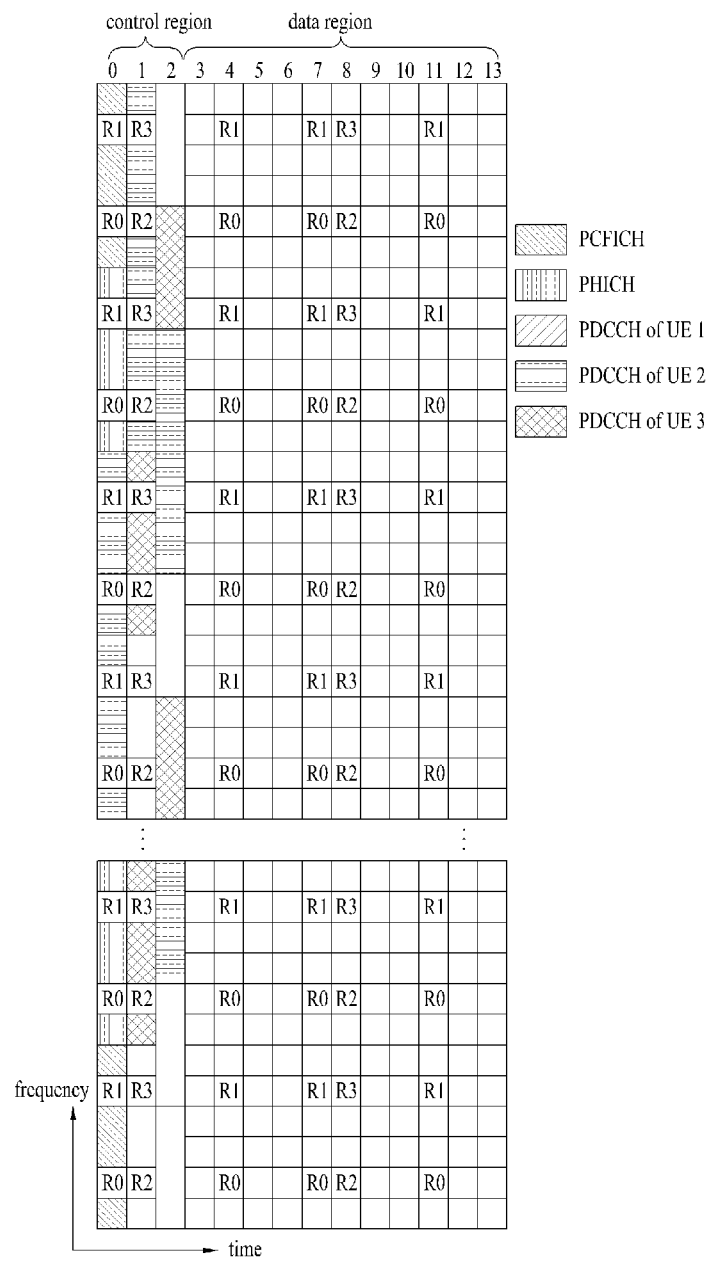
FIG. 4 is a diagram illustrating a structure of a downlink radio frame used in an LTE system.

FIG. 4 is a diagram illustrating a control channel included in a control region of one subframe in a downlink radio frame.

Referring to FIG. 4, the subframe includes fourteen (14) OFDM symbols. First one to three OFDM symbols are used as the control region in accordance with subframe configuration, and the other thirteen to eleven OFDM symbols are used as the data region. In FIG. 4, R1 to R4 represent reference signals (RS) (or pilot signals) of antennas 0 to 3. The RS is fixed by a given pattern within the subframe regardless of the control region and the data region. The control channel is allocated to a resource to which the RS is not allocated in the control region, and a traffic channel is also allocated to a resource to which the RS is not allocated in the data region. Examples of the control channel allocated to the control region include a Physical Control Format Indicator Channel (PCFICH), a Physical Hybrid-ARQ Indicator Channel (PHICH), and a Physical Downlink Control Channel (PDCCH).

The PCFICH notifies the user equipment of the number of OFDM symbols used in the PDCCH per subframe. The PCFICH is located at the first OFDM symbol and configured prior to the PHICH and the PDCCH. The PCFICH includes four resource element groups (REG), each of which is distributed in the control region based on cell identity (cell ID). One REG includes four resource elements (REs). The RE represents a minimum physical resource defined by one subcarrier×one OFDM symbol. The PCFICH value indicates a value of 1 to 3 or a value of 2 to 4 depending on a bandwidth, and is modulated by Quadrature Phase Shift Keying (QPSK).

The PHICH is a physical hybrid-automatic repeat and request (HARQ) indicator channel and is used to carry HARQ ACK/NACK signals for uplink transmission. That is, the PHICH represents a channel to which DL ACK/NACK information for UL HARQ is transmitted. The PHICH includes one REG, and is cell-specifically scrambled. The ACK/NACK signals are indicated by 1 bit, and are modulated by binary phase shift keying (BPSK). The modulated ACK/NACK are spread by a spreading factor (SF)=2 or 4. A plurality of PHICHs may be mapped with the same resource and constitute a PHICH group. The number of PHICHs multiplexed in the PHICH group is determined by the number of spreading codes. The PHICH (group) is repeated three times to obtain diversity gain in the frequency domain and/or the time domain.

The PDCCH is allocated to first n number of OFDM symbols of the subframe, wherein n is an integer of 1 or greater and is indicated by the PCIFCH. The PDCCH includes one or more control channel elements (CCEs). The PDCCH notifies each user equipment or user equipment group of information related to resource allocation of transport channels, i.e., a paging channel (PCH) and a downlink-shared channel (DL-SCH), uplink scheduling grant, HARQ information, etc. The paging channel (PCH) and the downlink-shared channel (DL-SCH) are transmitted through the PDSCH. Accordingly, the base station and the user equipment respectively transmit and receive data through the PDSCH except for specific control information or specific service data.

Information as to user equipment(s) (one user equipment or a plurality of user equipments) to which data of the PDSCH are transmitted, and information as to how the user equipment(s) receives and decodes PDSCH data are transmitted by being included in the PDCCH. For example, it is assumed that a specific PDCCH is cyclic redundancy check (CRC) masked with radio network temporary identity (RNTI) called "A," and information of data transmitted using a radio resource (for example, frequency location) called "B" and transmission format information (for example, transport block size, modulation mode, coding information, etc.) called "C" is transmitted through a specific subframe. In this case, a user equipment located in a corresponding cell monitors the PDCCH by using its RNTI information, and if there are one or more user equipments having RNTI called "A", the user equipments receive the PDCCH, and receive the PDSCH indicated by "B" and "C" through information of the received PDCCH.

Figure 5:
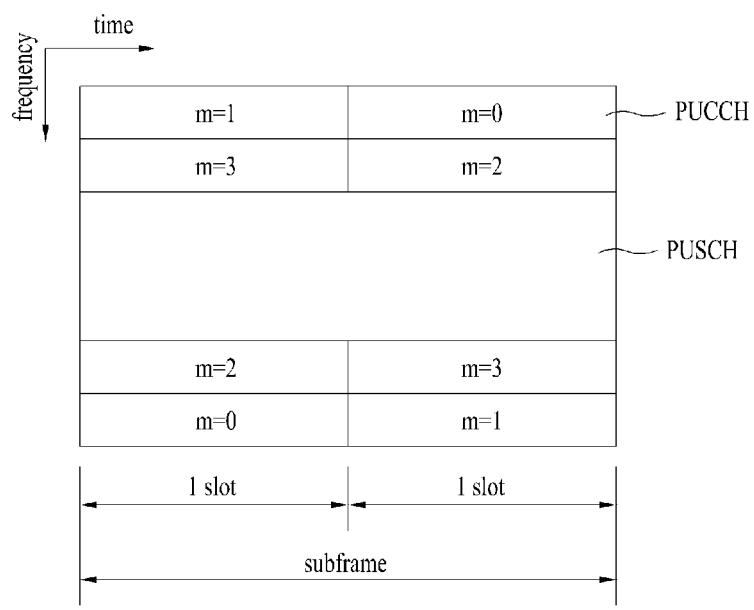
FIG. 5 is a diagram illustrating a structure of an uplink subframe used in an LTE system.

FIG. 5 is a diagram illustrating a structure of an uplink subframe used in an LTE system.

Referring to FIG. 5, the uplink subframe may be divided into a region to which a physical uplink control channel (PUCCH) carrying control information is allocated, and a region to which a physical uplink shared channel (PUSCH) carrying user data is allocated. The center part of the subframe is allocated to the PUSCH, and both parts of the data region in the frequency domain are allocated to the PUCCH. Examples of the control information transmitted on the PUCCH include ACK/NACK used for HARQ, a channel quality indicator (CQI) indicating a downlink channel status, a rank indicator (RI) for MIMO, and a scheduling request (SR) corresponding to an uplink resource allocation request. The PUCCH for one user equipment uses one resource block that reserves different frequencies in each slot within the subframe. Namely, two resource blocks allocated to the PUCCH are subjected to frequency hopping in the boundary of the slots. Particularly, FIG. 5 exemplarily illustrates that PUCCH of m=0, PUCCH of m=1, PUCCH of m=2, and PUCCH of m=3 are allocated to the subframe.

Also, a time when a sounding reference signal can be transmitted within one subframe is a slot of a symbol located at the last location on a time axis at one subframe, and the sounding reference signal is transmitted through a data transmission band on the frequency. Sounding reference signals of multiple users, which are transmitted to the last symbol of the same subframe may be identified from one another depending on frequency location.

Figure 6:
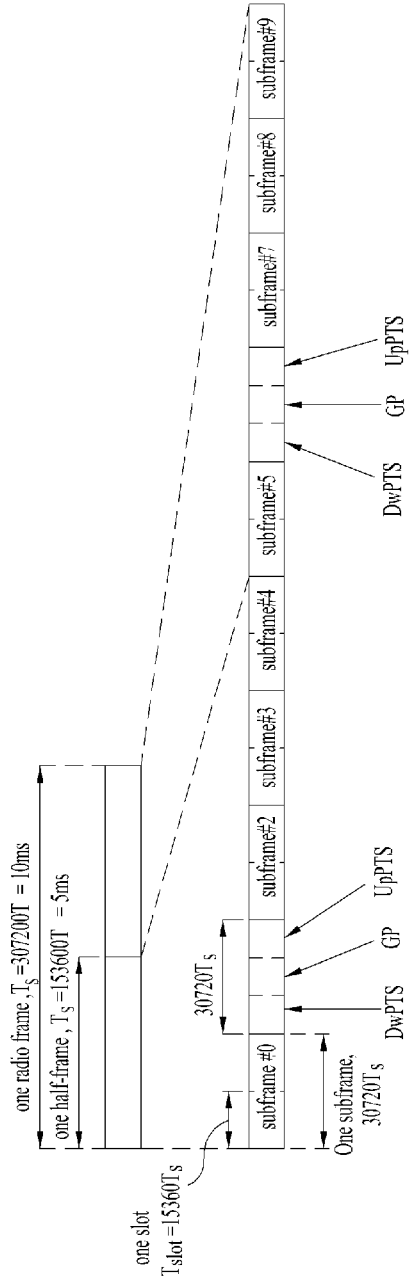
FIG. 6 is a diagram illustrating a structure of a radio frame used in an LTE TDD system.

FIG. 6 is a diagram illustrating a structure of a radio frame in an LTE TDD system. The radio frame in the LTE TDD system includes two half frames, each of which includes four general subframes and a special subframe, wherein the four general subframes include two slots, and the special subframe includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used to synchronize channel estimation at the base station with uplink transmission of the user equipment. That is, the DwPTS is used for downlink transmission, and the UpPTS is used for uplink transmission. Particularly, the UpPTS is used for PRACH preamble or SRS transmission. Also, the guard period is to remove interference occurring in the uplink due to multipath delay of downlink signals between the uplink and the downlink.

Meanwhile, uplink/downlink subframe configuration (UL/DL configuration) in the LTE TDD system is as illustrated in Table 1 below.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 1, D indicates a downlink subframe, U indicates an uplink subframe, and S means the special subframe. Also, Table 1 also illustrates a downlink-to-uplink switching period in uplink/downlink subframe configuration of each system.

Figure 7:
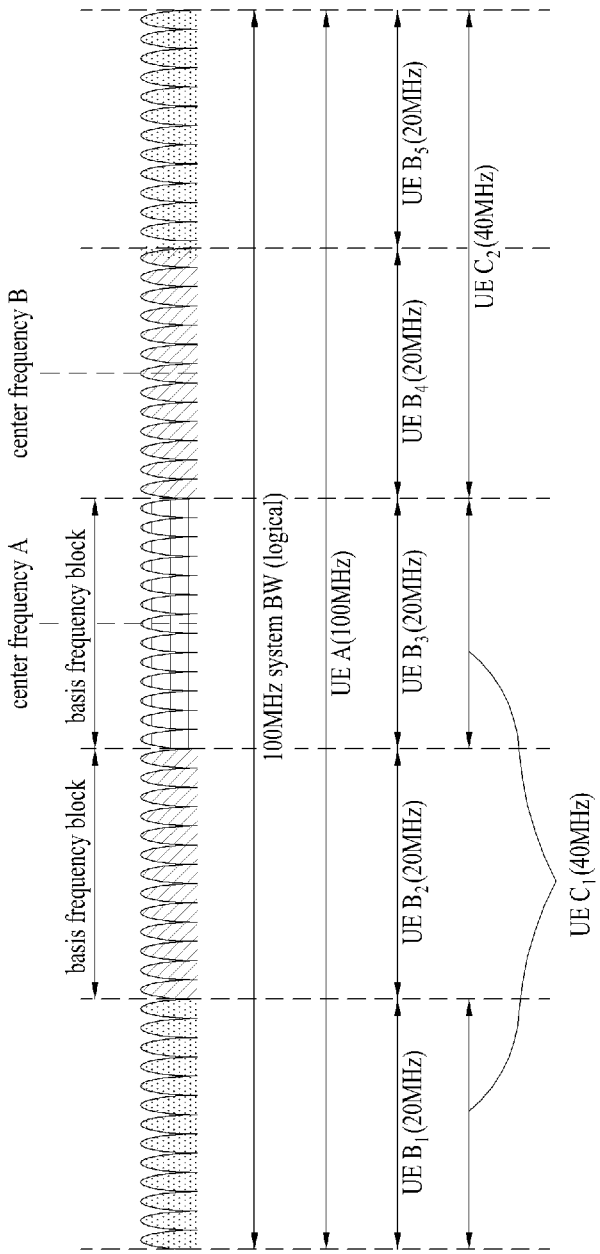
FIG. 7 is a conceptual diagram illustrating a carrier aggregation scheme.

Hereinafter, a carrier aggregation scheme will be described. FIG. 7 is a conceptual diagram illustrating a carrier aggregation scheme.

Carrier aggregation refers to a method for allowing a UE to use a plurality of frequency blocks or (logical) cells, each of which is comprised of uplink resources (or component carriers (CCs)) and/or downlink resources (or CCs), as one large logical band so as to provide a wireless communication system with a wider frequency bandwidth. For convenience of description and better understanding of the present invention, carrier aggregation will hereinafter be referred to as a component carrier (CC).

Referring to FIG. 7, the entire system bandwidth (System BW) includes a bandwidth of maximum 100 MHz as a logical bandwidth. The entire system bandwidth (system BW) includes five component carriers (CCs), each of which has a maximum bandwidth of 20 MHz. The CC includes one or more physically contiguous subcarriers. Although all CCs have the same bandwidth in FIG. 7, this is only exemplary and the CCs may have different bandwidths. Although the CCs are shown as being contiguous in the frequency domain in FIG. 7, FIG. 7 merely shows the logical concept, and thus the CCs may be physically contiguous or separated.

Different center frequencies may be used for the CCs or one common center frequency may be used for physically contiguous CCs. For example, in FIG. 7, if it is assumed that all CCs are physically contiguous, a center frequency A may be used. If it is assumed that CCs are not physically contiguous, a center frequency A, a center frequency B and the like may separately be used for the respective CCs.

In the present specification, the CC may correspond to a system band of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system band of the LTE system. In this case, the CC may have any one bandwidth of 1.25, 2.5, 5, 10 or 20 MHz.

In the case in which the entire system band is extended by carrier aggregation, a frequency band used for communication with each UE is defined in CC units. A UE A may use 100 MHz which is the bandwidth of the entire system band and perform communication using all five CCs. Each of UEs $B_1$ to $B_5$ may only use a bandwidth of 20 MHz and perform communication using one CC. Each of UEs $C_1$ and $C_2$ may use a bandwidth of 40 MHz and perform communication using two CCs. The two CCs may be contiguous or non-contiguous logically/physically. The UE $C_1$ uses two non-contiguous CCs and the UE $C_2$ uses two contiguous CCs.

One downlink CC and one uplink CC may be used in the LTE system while several CCs may be used in the LTE-A system as shown in FIG. 6. At this time, a method of scheduling a data channel by a control channel may be divided into a linked carrier scheduling method and a cross carrier scheduling method.

In more detail, in the linked carrier scheduling method, similarly to the legacy LTE system using a single CC, a control channel transmitted via a specific CC schedules only a data channel via the specific CC.

In contrast, in the cross carrier scheduling method, a control channel transmitted via a primary CC using a carrier indicator field (CIF) schedules a data channel transmitted via the primary CC or another CC.

Hereinafter, a method for controlling an uplink transmission power in the LTE system will be described.

A method for allowing a UE to control an uplink transmission power includes open loop power control (OLPC) and closed-loop power control (CLPC). OLPC serves to control a power by estimating and compensating for downlink signal attenuation from a base station of a cell to which the UE belongs, and controls an uplink power by increasing an uplink transmission power when a distance between the UE and the base station increases and thus signal attenuation of a downlink increases. CLPC controls an uplink power by directly transmitting information (that is, a control signal) required to adjust an uplink transmission power in the base station.

The following Equation 1 is to determine the transmission power of the user equipment when a serving cell 'c' in the system, which supports the CA scheme, transmits PUSCH only without transmitting PUCCH on a subframe index i.

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm]$$

[Equation 1]

The following Equation 2 is to determine the PUSCH transmission power when the serving cell 'c' in the system, which supports CA, simultaneously transmits PUSCH and PUCCH on the subframe index i.

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm]$$

[Equation 2]

Hereinafter, parameters, which will be described in respect of the Equation 1 and the Equation 2, determine the uplink transmission power of the user equipment in the serving cell 'c'. In this case, $P_{CMAX,c}(i)$ of the Equation 1 represents a maximum power of the user equipment, which may be transmitted, at the subframe index i, and $\hat{P}_{CMAX,c}(i)$ of the Equation 2 represents a linear value of $P_{CMAX,c}(i)$. $\hat{P}_{PUCCH}(i)$ of the Equation 2 represents a linear value of $P_{PUCCH}(i)$ (in this case, $P_{PUCCH}(i)$ represents PUCCH transmission power on subframe index i).

In the Equation 1 again, $M_{PUSCH,c}(i)$ is a parameter representing a bandwidth of PUSCH resource allocation expressed by the number of useful resource blocks for the subframe index i, and is a value allocated by the base station. $P_{O\_PUSCH,c}(j)$ is a parameter configured by a sum of a cell-specific nominal component $P_{O\_NOMINAL\_PUSCH,c}(j)$ provided from a higher layer and a user equipment-specific component $P_{O\_UE\_PUSCH,c}(j)$ provided from the higher layer, and is a value notified to the user equipment by the base station.

PUSCH transmission/retransmission corresponding to a grant which is dynamically scheduled is j=1, and PUSCH transmission/retransmission corresponding to a random access response grant is j=2. And, $P_{O\_UE\_PUSCH,c}(2)=0$ and $P_{O\_NOMINAL\_PUSCH,c}(2)=P_{O\_PRE}+\Delta_{PREAMBLE\_Msg3}$ are obtained, and parameters $P_{O\_PRE}$ and $\Delta_{PREAMBLE\_Msg3}\Delta_{PREAMBLE\_Msg3}$ are signaled from the higher layer.

$\alpha_c(j)$ is a pathloss compensation factor, and is a cell-specific parameter provided from the higher layer and transmitted from the base station by 3 bits, wherein $\alpha \in \{0, 0.4, 0.5, 0.6, 0.7, 0.8, 0.9, 1\}$ is obtained when j=0 or 1, and $\alpha_c(j)$ is equal to 1, that is, $\alpha_c(j)=1$ when j=2 $\alpha_c(j)$ is a value notified to the user equipment by the base station.

pathloss $PL_c$ is a downlink pathloss (or signal loss) estimated value calculated by the user equipment in a unit of dB, and is expressed as PLc=referenceSignalPower−higher layer filteredRSRP, wherein referenceSignalPower may be notified to the user equipment by the base station through the higher layer.

$f_c(i)$ is a value representing a current PUSCH power control adjustment state for the subframe index i, and may be expressed as a current absolute value or an accumulated value. If accumulation is enabled on the basis of a parameter provided from the higher layer or a TPC command $\delta_{PUSCH,c}$ is included in the PDCCH together with a DCI format 0 for the serving cell 'c' in which CRC is scrambled with Temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled for subframe i−$K_{PUSCH}$ through the PDCCH together with the DCI formats 0/4 or 3/3A, wherein $f_c(0)$ is the first value after reset of the accumulated value.

The value of $K_{PUSCH}$ is defined in the LTE standard as follows.

For FDD (Frequency Division Duplex), the value of $K_{PUSCH}$ is 4. In TDD, the value of $K_{PUSCH}$ is as illustrated in Table 2 below.

TABLE 2

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The user equipment tries to decode the PDCCH of the DCI formats 0/4 with its C-RNTI or the PDCCH of the DCI formats 3/3A with its TPC-PUSCH-RNTI and the DCI format for SPS C-RNTI every subframe except for a case of discontinued reception (DRX). If the DCI formats 0/4 and the DCI formats 3/3A for the serving cell 'c' are detected for the same subframe, the user equipment should use $\delta_{PUSCH,c}$ provided by the DCI formats 0/4. $\delta_{PUSCH,c}=0$ dB is obtained for a subframe in which there is no TPC command decoded for the serving cell 'c', DRX occurs, or a subframe having an index i not an uplink subframe in TDD.

The accumulated value of $\delta_{PUSCH,c}$ signaled on the PDCCH together with the DCI formats 0/4 is as illustrated in Table 3 below. If the PDCCH is validated by SPS activation together with the DCI format 0 or is released, $\delta_{PUSCH,c}=0$ dB. The accumulated value of $\delta_{PUSCH,c}$ signaled on the PDCCH together with the DCI formats 3/3A is one of SET1 of the following Table 3 or one of SET2 of the following Table 4, which is determined by a TPC-index parameter provided from the higher layer.

TABLE 3

| TPC Command Field in DCI format 0/3/4 | Accumulated $\delta_{PUSCH, c}$ [dB] | Absolute $\delta_{PUSCH, c}$ [dB] only DCI format 0/4 |
|---|---|---|
| 0 | −1 | −4 |
| 1 | 0 | −1 |
| 2 | 1 | 1 |
| 3 | 3 | 4 |

TABLE 4

| TPC Command Field in DCI format 3A | Accumulated $\delta_{PUSCH,c}$ [dB] |
|---|---|
| 0 | −1 |
| 1 | 1 |

If the user equipment reaches a transmission maximum power $P_{CMAX,c}$ at the serving cell 'c', a positive TPC command for the serving cell 'c' is not accumulated. On the other hand, if the user equipment reaches a minimum power, a negative TPC command is not accumulated.

The following Equation 3 is an equation related to control of an uplink power for a PUCCH in the LTE system.

$$P_{PUCCH}(i) = \min\left\{ \begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array} \right\} [dBm]$$

[Equation 3]

In the Equation 3, i denotes a subframe index, and c denotes a cell index. When the user equipment is configured by a higher layer to transmit a PUCCH on two antenna ports, a value of $\Delta_{TxD}(F')$ is provided to the user equipment by the higher layer, and 0 is provided otherwise. A parameter described below is a parameter for a serving cell having a cell index c.

In this case, $P_{CMAX,c}(i)$ indicates a maximum power that may be transmitted by the user equipment, $P_{0\_PUCCH}$ is a parameter comprised of a sum of cell-specific parameters, and is reported by a base station through higher layer signaling, and $PL_c$ is an estimate of downlink path loss (or signal loss) calculated by the user equipment in a unit of dB, and is expressed by $PL_c$=referenceSignalPower−higher layer filteredRSRP. h(n) is a variable depending on a PUCCH format, $n_{CQI}$ is the number of information bits for CQI, and $n_{HARQ}$ indicates the number of HARQ bits. A value $\Delta_{F\_PUCCH}(F)$ is a relative value with respect to a PUCCH format 1a, and is a value reported by the base station through higher layer signaling as a value corresponding to a PUCCH format #F. g(i) indicates a current PUCCH power control adjustment state of a subframe index i.

When a value $P_{O\_UE\_PUCCH}$ is changed in a higher layer, an equation g(0)=0 is satisfied. Otherwise, an equation g(0)=$\Delta P_{rampup}+\delta_{msg2}$ is satisfied. $\delta_{msg2}$ is a TPC command indicated in a random access response, and $\Delta P_{rampup}$ corresponds to a total power ramp-up from first to last preambles provided by a higher layer.

When the user equipment reaches a transmission maximum power $P_{CMAX,c}(i)$ in a primary cell, a positive TPC command is not accumulated for the primary cell. On the other hand, when the user equipment reaches a minimum power, a negative TPC command is not accumulated. The user equipment resets accumulation when the value $P_{O\_UE\_PUCCH}$ is changed by a higher layer, or a random access response message is received.

Meanwhile, Tables 5 and 6 below show values of $\delta_{PUCCH}$ indicated by a TPC command field in DCI formats. In particular, Table 5 shows values of $\delta_{PUCCH}$ indicated by DCI formats other than DCI format 3A, and Table 6 shows values of $\delta_{PUCCH}$ indicated by DCI format 3A.

TABLE 5

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 6

| TPC Command Field in DCI format 3A | $\delta_{PUCCH}$ [dB] |
|---|---|
| 0 | −1 |
| 1 | 1 |

The following Equation 4 is an equation related to control of power of an SRS in the LTE system.

$$P_{SRS,c}(i) = \min\left\{ \begin{array}{l} P_{CMAX,c}(i) \\ P_{SRS\_OFFSET,c}(m) + 10\log_{10}(M_{SRS,c}) + \\ P_{O\_PUSCH,c}(j) + \alpha_c(j) \cdot PL_c + f_c(i) \end{array} \right\} [dBm]$$

[Equation 4]

In the Equation 4, i denotes a subframe index and c denotes a cell index. In this case, $P_{CMAX,c}(i)$ indicates a maximum power that may be transmitted by the user equipment, and $P_{SRS\_OFFSET,c}(m)$ indicates a value set by a higher layer, corresponds to a case of transmitting a periodic sounding reference signal when m is 0, and corresponds to a case of transmitting an aperiodic sounding reference signal when m is 1. $M_{SRS,c}$ denotes a sounding reference signal bandwidth on a subframe index i of a serving cell c, and is expressed by the number of resource blocks.

$f_c(i)$ denotes a value indicating a current PUSCH power control adjustment state for a subframe index i of a serving cell c, and $P_{O\_PUSCH,c}(j)$ and $\alpha_c(j)$ are as described in the above Equations 1 and 2.

Hereinafter, the sounding reference signal will be described.

The sounding reference signal includes a constant amplitude zero auto correlation (CAZAC) sequence. The sounding reference signals transmitted from a plurality of user equipments are CAZAC sequences $r^{SRS}(n) = r_{u,v}^{(\alpha)}(n)$ having different cyclic shift values α based on the following Equation 5.

$$\alpha = 2\pi \frac{n_{SRS}^{cs}}{8}$$

[Equation 5]

In this case, $n_{SRS}^{cs}$ is a value set for each user equipment by the upper layer, and has an integer value between 0 and 7. Accordingly, the cyclic shift value may have eight values depending on $n_{SRS}^{cs}$.

The CAZAC sequences generated through cyclic shift from one CAZAC sequence are characterized in that they have a zero-correlation value with the sequences having different cyclic shift values. The sounding reference signals of the same frequency domain can be identified from one another depending on the CAZAC sequence cyclic shift value by using the above characteristic. The sounding reference signal of each user equipment is allocated on the frequency depending on a parameter set by the base station. The user equipment performs frequency hopping of the sounding reference signal to transmit the sounding reference signal to all of uplink data transmission bandwidths.

Hereinafter, a detailed method for mapping a physical resource for transmitting a sounding reference signal in an LTE system will be described.

After being multiplied by an amplitude scaling parameter $\beta_{SRS}$ to satisfy the transmission power $P_{SRS}$ of the user equipment, the sounding reference signal sequence $r_{SRS}(n)$ is mapped into a resource element (RE) having an index of (k, l) from $r^{SRS}(0)$ by the following Equation 6.

$$a_{2k+k_0, l} = \begin{cases} \beta_{SRS} r^{SRS}(k) & k = 0, 1, \ldots, M_{sc,b}^{RS} - 1 \\ 0 & \text{otherwise} \end{cases} \quad \text{[Equation 6]}$$

In the Equation 2, $k_0$ denotes a frequency domain start point of the sounding reference signal, and is defined by the following Equation 7.

$$k_0 = k'_0 + \sum_{b=0}^{B_{SRS}} 2M_{sc,b}^{RS} n_b \quad \text{[Equation 7]}$$

In the Equation 7, $n_b$ denotes a frequency location index. Also, $k'_0$ for a general uplink subframe is defined by the following Equation 8, and $k'_0$ for an uplink pilot timeslot (UpPTS) is defined by the following Equation 9.

$$k'_0 = (\lfloor N_{RB}^{UL}/2 \rfloor - m_{SRS,0}/2)N_{SC}^{RB} + k_{TC} \quad \text{[Equation 8]}$$

$$k'_0 = \quad \text{[Equation 9]}$$
$$\begin{cases} (N_{RB}^{UL} - m_{SRS,0}^{max})N_{sc}^{RB} + k_{TC} & \text{if } \left( \begin{array}{c} (n_f \bmod 2) \times \\ (2 - N_{SP}) + n_{hf} \end{array} \right) \bmod 2 = 0 \\ k_{TC} & \text{otherwise} \end{cases}$$

In the Equation 8 and the Equation 9, $k_{TC}$ is a transmissionComb parameter signaled to the user equipment through the upper layer and has a value of 0 or 1. Also, $n_{hf}$ is 0 at the uplink pilot timeslot of the first half frame and 0 at the uplink pilot timeslot of the second half frame. $M_{sc,b}^{RS}$ is a length, i.e., bandwidth, of a sounding reference signal sequence, which is expressed in a unit of subcarrier defined as expressed by the following Equation 10.

$$M_{sc,b}^{RS} = m_{SRS,b} N_{sc}^{RB}/2 \quad \text{[Equation 10]}$$

In the Equation 10, $m_{SRS,b}$ is a value signaled from the base station depending on an uplink bandwidth $N_{RB}^{UL}$.

The user equipment can perform frequency hopping of the sounding reference signal to transmit the sounding reference signal to all the uplink data transmission bandwidths. The frequency hopping is set by a parameter $b_{hop}$ having a value of 0 to 3 given by the upper layer.

If frequency hopping of the sounding reference signal is not activated, i.e., in case of $b_{hop} \geq B_{SRS}$, the frequency location index $n_b$ has a constant value as expressed by the following Equation 11. In the Equation 11, $n_{RRC}$ is a parameter given by the upper layer.

$$n_b = \lfloor 4n_{RRC}/m_{SRS,b} \rfloor \bmod N_b \quad \text{[Equation 11]}$$

Meanwhile, if frequency hopping of the sounding reference signal is activated, i.e., in case of $b_{hop} < B_{SRS}$, the frequency location index $n_b$ is defined by the following Equations 12 and 13.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_B & \text{otherwise} \end{cases} \quad \text{[Equation 12]}$$

$$F_b(n_{SRS}) = \begin{cases} (N_b/2) \left\lfloor \frac{n_{SRS} \bmod \Pi_{b'=b_{hop}}^{b} N_{b'}}{\Pi_{b'=b_{hop}}^{b-1} N_{b'}} \right\rfloor + \\ \quad \left\lfloor \frac{n_{SRS} \bmod \Pi_{b'=b_{hop}}^{b} N_{b'}}{2\Pi_{b'=b_{hop}}^{b-1} N_{b'}} \right\rfloor & \text{if } N_b \text{ even} \\ \lfloor N_b/2 \rfloor \lfloor n_{SRS}/\Pi_{b'=b_{hop}}^{b-1} N_{b'} \rfloor & \text{if } N_b \text{ odd} \end{cases} \quad \text{[Equation 13]}$$

In this case, $n_{SRS}$ is a parameter that calculates the number of transmission times of the sounding reference signal and is defined by the following Equation 14.

$$n_{SRS} = \begin{cases} 2N_{SP}n_f + 2(N_{SP} - 1)\lfloor \frac{n_s}{10} \rfloor + \lfloor \frac{T_{offset}}{T_{offset\_max}} \rfloor, \\ \lfloor (n_f \times 10 + \lfloor n_s/2 \rfloor)/T_{SRS} \rfloor, \end{cases} \quad \text{[Equation 14]}$$

for 2 ms SRS periodicity of TDD frame structure otherwise

In the Equation 14, $T_{SRS}$ is a period of the sounding reference signal, and $T_{offset}$ denotes subframe offset of the sounding reference signal. Also, $n_s$ denotes a slot number, and $n_f$ denotes a frame number.

A sounding reference signal setup index $I_{SRS}$ for setting the period $T_{SRS}$ of the sounding reference signal and the subframe offset $T_{offset}$ is expressed as illustrated in the following Table 7 to Table 10 depending on an FDD system or a TDD system. In particular, Table 7 illustrates the sounding reference signal setup index in case of the FDD system, and Table 8 illustrates the sounding reference signal setup index in case of the TDD system. Also, the following Table 7 and Table 8 illustrate a period and offset information of a triggering type 0, that is, periodic SRS.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 8

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |

TABLE 8-continued

| Configuration Index $I_{SRS}$ | SRS Periodicity $T_{SRS}$ (ms) | SRS Subframe Offset $T_{offset}$ |
|---|---|---|
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-44 | 20 | $I_{SRS} - 25$ |
| 45-84 | 40 | $I_{SRS} - 45$ |
| 85-164 | 80 | $I_{SRS} - 85$ |
| 165-324 | 160 | $I_{SRS} - 165$ |
| 325-644 | 320 | $I_{SRS} - 325$ |
| 645-1023 | reserved | reserved |

The following Table 9 and Table 10 illustrate a period and offset information of a triggering type 1, that is, aperiodic SRS. In particular, Table 9 illustrates a period and offset information of a triggering type 1, that is, aperiodic SRS in case of the FDD system, and Table 10 illustrates a period and offset information of a triggering type 1, that is, aperiodic SRS in case of the TDD system.

TABLE 9

| SRS Configuration Index $I_{SRS}$ | SRS Periodicity $T_{SRS, 1}$ (ms) | SRS Subframe Offset $T_{offset, 1}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-31 | reserved | reserved |

TABLE 10

| SRS Configuration Index $I_{SRS}$ | SRS Periodicity $T_{SRS, 1}$ (ms) | SRS Subframe Offset $T_{offset, 1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-31 | reserved | reserved |

In a recent wireless communication system, when the eNB performs a duplex operation by dividing entire available resources into a downlink resource and an uplink resource, a more flexible change technique for selecting a usage of each resource as one of a downlink resource and an uplink resource has been discussed.

The dynamic resource usage change has an advantage in that resource distribution may be performed optimally every time in a state that downlink traffic and uplink traffic are dynamically changed. For example, the FDD system manages a frequency band by dividing the frequency band into a downlink band and an uplink band. For such dynamic resource usage change, the eNB may designate whether a specific band is a downlink resource or an uplink resource at a specific time, through RRC layer, MAC layer or physical layer signal.

In particular, in the TDD system, entire subframes are divided into uplink subframes and downlink subframes and then respectively used for uplink transmission of the UE and downlink transmission of the eNB. This resource division may generally be given by a part of system information depending on uplink/downlink subframe configuration described in Table 1. Of course, new uplink/downlink subframe configuration other than the uplink/downlink subframe configuration of Table 1 may be provided additionally. For dynamic resource usage change in the TDD system, the eNB may designate whether a specific subframe corresponds to a downlink resource or an uplink resource at a specific time, through RRC layer, MAC layer or physical layer signal.

In the legacy LTE system, the downlink resource and the uplink resource are designated through system information. Since the system information should be transmitted to a plurality of unspecified UEs, a problem may occur in operation of the legacy UEs in case of dynamic change. Therefore, information on dynamic resource usage change is preferably transmitted to UEs, which are currently connected to the eNB, through new signaling, especially UE-specific signaling. This new signaling may indicate configuration of dynamically changed resources, for example, uplink/downlink subframe configuration information different from that indicated on system information in the TDD system.

Additionally, the new signaling may include information related to HARQ. In particular, if HARQ timing defined by a scheduling message, a PDSCH/PUSCH transmission timing point corresponding to the scheduling message and an HARQ-ACK transmission timing point for the PDSCH/PUSCH is dynamically changed, the new signaling may include HARQ timing configuration information, which may maintain stable HARQ timing even though resource configuration is dynamically changed, to solve a problem that HARQ timing is not continuous between changed timing points. In case of the TDD system, the HARQ timing configuration information may be represented as uplink/downlink subframe configuration considered when downlink HARQ timing and/or uplink HARQ timing is defined.

According to the aforementioned description, the UE that has accessed a system that dynamically changes resource usage receives various kinds of information on resource configuration. In particular, in case of the TDD system, one UE may acquire information as follows at a specific time:

1) uplink/downlink subframe configuration indicated by system information;

2) uplink/downlink subframe configuration transmitted to indicate usage of each subframe through separate signaling;

3) uplink/downlink subframe configuration transmitted to define when HARQ ACK for PDSCH received at downlink HARQ timing, that is, specific time will be transmitted; and 4) uplink/downlink subframe configuration transmitted to define when a PUSCH for an uplink grant received at an uplink HARQ timing, that is, specific time will be transmitted and when a PHICH for the PUSCH transmitted at the specific time will be received.

If a specific UE accesses an eNB that changes resource usage, the corresponding eNB is likely to be operated to designate uplink/downlink subframe configuration with more uplink subframes if possible through system information. This is because that there may be restriction in dynamic change of a subframe set to a downlink subframe on system information to an uplink subframe. For example, since legacy UEs perform CRS measurement while always expecting transmission of CRS from a subframe designated as a downlink subframe through system information, if the downlink subframe is dynamically changed to an uplink subframe, a big error may occur in CRS measurement of the legacy UEs. Therefore, the eNB configures more uplink subframes on the system information, but preferably manages uplink subframes by dynamically changing some of the uplink subframes to downlink subframes if downlink traffic is increased.

In the TDD system operated in accordance with the aforementioned principle, the UE is indicated uplink/downlink subframe configuration #0 as system information at a specific time. However, the UE may be indicated such that resource usage at each subframe actually becomes uplink/downlink subframe configuration #1.

Also, uplink/downlink subframe configuration #2 may be a reference of downlink HARQ timing. This is because that HARQ timing may continue even though the uplink/downlink subframe configuration is dynamically changed if the uplink/downlink subframe configuration with less uplink subframes and more downlink subframes includes maximum downlink subframes based on downlink HARQ timing to cause the most difficult status to transmit HARQ-ACK and downlink HARQ timing is managed in accordance with the status. Likewise, uplink/downlink subframe configuration with more uplink subframes, such as uplink/downlink subframe configuration #0, may be a reference of uplink HARQ timing.

Meanwhile, as described above, the uplink transmission power control of the UE includes open loop power control (OLPC) and closed-loop power control (CLPC). OLPC serves to control a power by estimating and compensating for downlink signal attenuation from a base station of a cell to which the UE belongs. For example, when a distance between the UE and the base station connected with the UE increases and thus signal attenuation of a downlink increases, the OLPC controls an uplink power by increasing a transmission power of an uplink. The CLPC controls an uplink power by directly transmitting information (that is, a control signal) required to adjust an uplink transmission power in the base station.

However, the conventional method for controlling an uplink power does not consider the status of the UE connected to the eNB that dynamically changes a resource usage. If the conventional method for controlling the power is applied to specific uplink transmission performed at the uplink subframe to which the dynamic resource usage change is applied, serious degradation of uplink transmission performance may be caused due to a big change of an interference environment, which is caused by downlink transmission of a neighboring cell.

For this reason, in the recent LTE system, a method for designating a plurality of subframe sets and applying different power control schemes to respective subframe sets has been discussed. Information on the plurality of subframe sets may be provided to the UE through a higher layer signal such as RRC signaling. In particular, the information may be provided by interworking with subframe set information which is used for another purpose of use, or may independently be signaled through RRC.

For convenience of description, it is assumed that a total of two subframe sets are signaled. In this case, two subframe sets will be referred to as a subframe set #1 and a subframe set #2, respectively. Each of the subframe set #1 and the subframe set #2 may be defined in the form of a subframe bitmap of a specific L bit size. In particular, each of the subframe set #1 and the subframe set #2 may correspond to a static subframe (static SF) and a flexible subframe (flexible SF), respectively.

Figure 8:
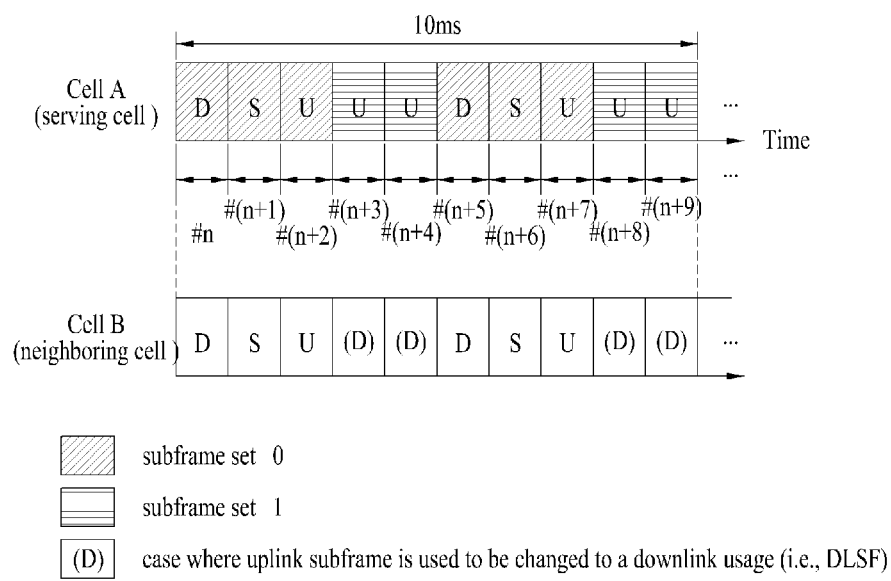
FIG. 8 is a diagram illustrating that one radio frame is categorized into a subframe set #1 and a subframe set #2.

FIG. 8 is a diagram illustrating that one radio frame is categorized into a subframe set #1 and a subframe set #2.

Referring to FIG. 8, the static subframe may mean conventional subframes to which dynamic resource usage change is not applied. Also, the flexible subframe may means subframes to which dynamic resource usage change is applied or may be applied. That is, since an interference environment may be varied at the flexible subframe during uplink transmission of the UE unlike the static subframe, it is preferable that a separate uplink power control scheme is applied to the flexible subframe.

In particular, FIG. 8 illustrates that a cell B changes usage of #(n+3)th, #(n+4)th, #(n+8)th, and #(n+9)th subframes to downlink subframes in a state that each of a cell A (serving cell) and the cell B (neighboring cell) configures uplink/downlink subframe configuration #0 (that is, DSUUUDSUUU) through system information.

In this case, the cell A may configure the subframe set #1 and the subframe set #2 for UEs which belong to the cell A, as shown in FIG. 8, and may apply a different power control scheme to each subframe set. That is, if inter-cell cooperation is available, neighboring cells may appropriately configure subframe sets by considering dynamic resource usage change when a specific cell applies dynamic resource usage change. Alternatively, the predetermined subframe set configurations are previously applied to the cells, whereby dynamic resource usage change may be applied to only a specific one (for example, subframe set #2 of FIG. 8) of the subframe sets.

In more detail, if the conventional PUSCH PC of a specific subframe set (for example, flexible subframe as a subframe set #1) is applied to another specific subframe set (for example, static subframe as a subframe set #1), performance degradation may be generated due to a big difference in an interference environment between the subframe sets.

The present invention suggests a configuration of a plurality of SRS power control processes similarly to a case where a plurality of PUSCH power control processes may be configured for a specific UE. In particular, an interworking relation between a specific SRS power control process and a specific PUSCH power control process may be configured.

For example, a correspondence relation may be configured in such a manner that a PUSCH power control process #1 interworks with an SRS power control process #1 and a PUSCH power control process #2 interworks with an SRS power control process #2. In this case, interworking may mean that at least one parameter of $\{P_{CMAX,c}(i), P_{SRS\_OFFSET,c}(m), M_{SRS,c}, P_{O\_PUSCH,c}(j), \alpha_c(j), PL_c, f_c(i)\}$ constituting the SRS power control process is the same as a corresponding parameter of the PUSCH power control process interworking with the SRS power control process or is determined to interwork with the corresponding parameter of the PUSCH power control process through a specific function. In more detail $\{P_{O\_PUSCH,c}(j), \alpha_c(j), PL_c, f_c(i)\}$ may equally be configured/applied to the corresponding interworking parameters of the PUSCH power control process. $P_{SRS\_OFFSET,c}(n)$ may separately be configured per SRS power control process, or may commonly be configured between some SRS power control processes.

Each SRS power control process may be configured by a triggering type 0, that is, periodic SRS (P-SRS), or may be configured by a triggering type 1, that is, aperiodic SRS (A-SRS). Although a plurality of A-SRS configurations may exist depending on a triggering bit, a period $T_{SRS,1}$ and subframe offset $T_{offset,1}$ may be defined to be commonly applied to all the A-SRS configurations. As described above, the subframe set defined by the period $T_{SRS,1}$ and the subframe offset $T_{offset,1}$ will be referred to as an A-SRS subframe set.

The present invention additionally considers a method for separately configuring A-SRS subframe set information for each A-SRS configuration as well as a case where the A-SRS subframe set is commonly provided for all the A-SRS configurations through RRC signaling, and suggests a method for UE operation as to which SRS power control process is used such that a specific A-SRS triggers A-SRS transmission.

In the present invention, it is assumed that the UE receives specific power control subframe set information such as the subframe set #1 (for example, the "static subframe") and the subframe set #2 (for example, the "flexible subframe") from a higher layer signal. The power control subframe set information and the A-SRS subframe set information may be provided as separate information, or may be configured to interwork with each other in such a manner that the power control subframe set #1 is the same as A-SRS subframe set #0 and the power control subframe set #2 is the same as A-SRS subframe set #1.

Hereinafter, the UE is configured by two power control subframe sets, that is, the subframe the power control subframe set #1 and the power control subframe set #2. However, it will be apparent that three or more power control subframe sets may be provided in the present invention. Also, the two power control subframe sets may correspond to the static subframe and the flexible subframe set, respectively. However, this configuration is only exemplary, and each power control subframe set may be configured as random independent subframe set through RRC, and the UE may perform uplink transmission (for example, PUSCH transmission) at the corresponding subframe set in accordance with an uplink power control process interworking with each of the configured power control subframe sets.

Additionally, the power control subframe set #1 may be configured by the static subframes that always assure uplink subframe. On the other hand, the power control subframe set #2 may be configured by subframes that include subframes that are downlink subframes on system information but may dynamically be changed to uplink subframes and potential flexible subframes that are uplink subframes on system information but are reconfigured as downlink subframes by a higher layer signal or physical layer signal and then may be changed to uplink subframes by reconfiguration information after a specific time passes.

Hereinafter, embodiments to which the present invention is applied will be described in more detail.

<First Embodiment>

In the first embodiment of the present invention, the case where A-SRS subframe set information is commonly provided to all the A-SRS configurations will be described. In particular, in the first embodiment of the present invention, A-SRS transmission according to the following method 1) or 2) will be suggested.

Method 1)—Implicit Indication

If a triggering message of A-SRS is received at an nth subframe, A-SRS is transmitted at an mth subframe which belongs to A-SRS subframe set firstly after (n+k)th subframe (for example, n+4 subframe), and a transmission power of SRS is configured to transmit A-SRS by using a power control process applied to a corresponding subframe set depending on whether the corresponding mth subframe is a power control subframe set #1 or a power control subframe set #2.

At this time, A-SRS power control process previously interworking with each of the power control subframe set #1 and the power control subframe set #2 may be signaled through RRC layer. Alternatively, the A-SRS power control process may be defined in such a manner that the power control process previously interworking with each of the power control subframe set #1 and the power control subframe set #2 provides specific PUSCH power control process information only through RRC layer and information as to that each PUSCH power control process and a specific A-SRS power control process additionally interwork with each other is provided.

In conclusion, the A-SRS power control process interworking with the PUSCH power control process is applied based on the PUSCH power control process interworking with the power control subframe set to which the corresponding mth subframe belong.

Method 2)—Explicit Indication

Unlike the method 1), power control parameters or power control process index applied per A-SRS triggering field may be configured through RRC signaling. For example, at least one parameter of $\{P_{CMAX,c}(i), P_{SRS\_OFFSET,c}(m), P_{O\_PUSCH,c}(j), \alpha_c(j)\}$ may be configured per corresponding A-SRS triggering field. In this case, at least one parameter may be configured to interwork with an associated parameter of a specific PUSCH power control process.

Also, at this time, a single TPC accumulated process common for all the power control processes may be applied to TPC $f_c(i)$. In this case, $f_c(i)$ is applied to determination of a corresponding A-SRS transmission power in accordance with a corresponding single TPC. If a plurality of TPC parameters exist and each of the TPC parameters exists per specific power control process, a TPC parameter applied to each A-SRS triggering field may be configured through RRC signaling.

As described above, since the power control parameter or power control process index is explicitly configured per A-SRS triggering field, if the A-SRS triggering message is received at the nth subframe, A-SRS is transmitted at the mth subframe which belongs to A-SRS subframe set first after the (n+k)th subframe (for example, n+4 subframe).

Explicit interworking signaling as above may be defined as illustrated in Table 11 below. In particular, Table 11 illustrates that A-SRS triggering bit includes a size of 2 bits.

TABLE 11

| Value of SRS request field | Description |
| --- | --- |
| '00' | No type 1 SRS trigger |
| '01' | The 1$^{st}$ SRS parameter set configured by higher layers and PC parameters used for PUSCH in the subframe (on which the SRS triggered by this DCI is transmitted) |
| '10' | The 2$^{nd}$ SRS parameter set and PC parameter set 1 configured by higher layers |
| '11' | The 3$^{rd}$ SRS parameter set and PC parameter set 2 configured by higher layers |

A power control parameter set #1 (that is, power control subframe set #1) and a power control parameter set #2 (that is, power control subframe set #2) are described in each of field values '10' and '11' of Table 11. Also, implicit signaling of the method 1) is described in case of the field value of '01'. Although Table 11 illustrates a triggering field of a 2-bit size, the example of Table 11 may similarly be applied to a triggering field of 3-bit size or more.

Field values and their attributes may be defined in DCI having a triggering field of a 1-bit size as illustrated in Table 12 or Table 13 below.

TABLE 12

| Value of SRS request field | Description |
| --- | --- |
| '0' | No type 1 SRS trigger |
| '1' | The 1st SRS parameter set configured by higher layers and PC parameters used for PUSCH in the subframe (on which the SRS triggered by this DCI is transmitted) |

TABLE 13

| Value of SRS request field | Description |
| --- | --- |
| '0' | No type 1 SRS trigger |
| '1' | The 2nd SRS parameter set and PC parameter set 1 configured by higher layers |

Table 12 and Table 13 illustrate two types of different embodiments. That is, a field value '0' indicates 'no type 1 SRS trigger', that is, indicates that no A-SRS transmission is performed. Since RRC configuration may be performed by a field value only, RRC configuration based on the method 1) is provided in Table 10. In this case, if the UE receives the field value '1' through corresponding DCI, the UE determines and transmits a transmission power by applying a PUSCH power control process or power control parameter corresponding to a power control subframe set depending on the corresponding power control subframe set to which a subframe for transmitting a corresponding A-SRS belongs.

Also, if the field value '1' in Table 13 is received, the UE determines and transmits a transmission power of A-SRS by always applying the power control parameter set #1 (or power control subframe set #1) regardless of a power control subframe set to which a subframe for transmitting a corresponding A-SRS belongs. In Table 13, the power control parameter set #2 may be provided by RRC configuration for the field value '1'.

As another method, the field value '1' may be defined to always depend on a specific field value of a triggering field of a 2-bit size or more as illustrated in Table 11. For example, the field value '01' of Table 11 is automatically defined as RRC configuration of the field value '1'. At this time, a correlation between DCI having an A-SRS triggering field of a 1-bit size and DCI having an A-SRS triggering field of a 2-bit size or more may previously be defined, or may be provided through RRC signaling.

Meanwhile, if a plurality of kinds of DCI having an SRS triggering field of a specific N-bit size exist, RRC signaling may be performed such that the information in Table 11 to Table 13 may commonly be applied between the corresponding DCI, or separate information may be RRC signaled per DCI. Alternatively, multiple tables for a correlation between the SRS triggering field and the power control process as illustrated in Table 11 to Table 13 may be configured, and different tables may be configured depending on whether DCI is detected from a UE specific search space or a common search space and depending on whether the corresponding DCI is detected from general PDCCH or received through EPDCCH (Enhanced PDCCH) received through a data region.

Meanwhile, as illustrated in Table 12 and Table 13, RRC configuration for a specific field value (for example, field value '1') may not be RRC signaled to the UE, and the UE may be operated to determine and transmit a power of A-SRS by always using only a power control parameter set of the lowest index (or the highest index). For example, if it is defined that the power control parameter set of the lowest index is always used in a state that indexes 0 to N are given to power control parameter sets, and if a specific field value is dynamically triggered, the UE may be operated to always determine and transmit the power of the A-SRS in accordance with the power control parameter set #1. In this case, it is advantageous in that RRC signaling overhead may be reduced. This is because that a specific power control parameter set desired to be configured by the base station may always be configured/reconfigured by the lowest index (or the highest index) to determine the power of the A-SRS through dynamic indication based on the corresponding field value.

<Second Embodiment>

In the second embodiment of the present invention, the case where A-SRS subframe set information is separately provided to each of the A-SRS configurations will be described. In particular, in the second embodiment of the present invention, A-SRS transmission according to the following method 3) or 4) will be suggested.

Method 3)—Implicit Indication

If a triggering message of A-SRS is received at an nth subframe, A-SRS is transmitted at an mth subframe which belongs to A-SRS subframe set configured separately in a triggering field of the corresponding A-SRS firstly after (n+k)th subframe (for example, n+4 subframe), and a transmission power of SRS is configured to transmit A-SRS by using a power control process applied to a corresponding subframe set depending on whether the corresponding mth subframe is a power control subframe set #1 or a power control subframe set #2.

At this time, A-SRS power control process previously interworking with each of the power control subframe set #1 and the power control subframe set #2 may be signaled through RRC layer. Alternatively, the A-SRS power control process may be defined in such a manner that the power control process previously interworking with each of the power control subframe set #1 and the power control subframe set #2 provides specific PUSCH power control process information only through RRC layer and information as to that each PUSCH power control process and a specific A-SRS power control process additionally interwork with each other is provided. Likewise, the A-SRS power control process interworking with the PUSCH power control process is applied based on the PUSCH power control process interworking with the power control subframe set to which the corresponding mth subframe belong.

Method 4)—Explicit Indication

Unlike the method 1), A-SRS subframe set and power control parameters (or power control process index) applied per A-SRS triggering field may be configured through RRC signaling. For example, at least one parameter of $\{P_{CMAX,c}(i), P_{SRS\_OFFSET,c}(m), P_{O\_PUSCH,c}(j), \alpha_c(j)\}$ may be configured per corresponding A-SRS triggering field. In this case, at least one parameter may be configured to interwork with an associated parameter of a specific PUSCH power control process. Also, at this time, a single TPC accumulated process common for all the power control processes may be applied to TPC $f_c(i)$. In this case, $f_c(i)$ is applied to determination of a corresponding A-SRS transmission power in accordance with a corresponding single TPC. If a plurality of TPC parameters exist and each of the TPC parameters exists per specific power control process, a TPC parameter applied to each A-SRS triggering field may be configured through RRC signaling.

As described above, since the power control parameter or power control process index is explicitly configured per A-SRS triggering field, if the A-SRS triggering message is received at the nth subframe, A-SRS is transmitted at the mth subframe which belongs to A-SRS subframe set configured separately in the corresponding A-SRS triggering field firstly after the (n+k)th subframe (for example, n+4 subframe).

In addition to the methods suggested as above, if A-SRS is triggered at the nth subframe regardless of A-SRS subframe (or in a specific status such as a case where there is no A-SRS subframe configuration), A-SRS is always transmitted at (n+k')th subframe (in this case, k' is 4 or may previously be defined. Alternatively, k' may be designated by dynamic signaling or semi-static signaling.) which is designated, wherein a power control process of SRS transmits A-SRS by using a power control process applied to a corresponding subframe set depending on whether the corresponding (n+k')th subframe is a power control subframe set #1 or a power control subframe set #2.

The A-SRS power control process previously interworking with each of the power control subframe set #1 and the power control subframe set #2 may be signaled through RRC layer. Alternatively, a specific A-SRS power control process may be defined in such a manner that the power control process previously interworking with each of the power control subframe set #1 and the power control subframe set #2 provides specific PUSCH power control process information only through RRC layer and information as to that each PUSCH power control process and a specific A-SRS power control process additionally interwork with each other is provided. That is, the A-SRS power control process interworking with the PUSCH power control process is applied based on the PUSCH power control process interworking with the power control subframe set to which the (n+k')th subframe belong.

Alternatively, if A-SRS is triggered at the nth subframe regardless of A-SRS subframe (or in a specific status such as a case where there is no A-SRS subframe configuration), A-SRS is transmitted at the mth subframe which belongs to the power control subframe set #p (in this case, a value of p may be specified as one of 1, 2, . . . by RRC configuration or fixed by a specific value) firstly after the (n+k)th subframe (for example, n=4th subframe), and at the same time a power of the SRS may be determined in accordance with a power control process of the corresponding power control subframe set #p. At this time, RRC configuration as to a corresponding control subframe set such as the value of p may be configured per A-SRS triggering field and/or specific DCI, or may commonly be applied to all of the A-SRSs.

Also, the A-SRS power control process previously interworking with each of the power control subframe set #1 and the power control subframe set #2 may be signaled through RRC layer. Alternatively, a specific A-SRS power control process may be defined in such a manner that the power control process previously interworking with each of the power control subframe set #1 and the power control subframe set #2 provides specific PUSCH power control process information only through RRC layer and information as to that each PUSCH power control process and a specific A-SRS power control process additionally interwork with each other is provided. That is, the A-SRS power control process interworking with the PUSCH power control process is applied based on the PUSCH power control process interworking with the power control subframe set to which the (n+k')th subframe belong.

Alternatively, if A-SRS is triggered at the nth subframe regardless of A-SRS subframe (or in a specific status such as a case where there is no A-SRS subframe configuration), A-SRS is transmitted at the mth subframe which belongs to a power control subframe set #q (in this case, a value of p may be determined automatically from 1, 2, . . . depending on a power control subframe set represented firstly after the (n+k)th subframe), and at the same time a transmission power of the SRS may be determined in accordance with a power control process of the corresponding power control subframe set #q. That is, since the value of q is not fixed but determined depending on a power control subframe set represented firstly after the (n=k)th subframe, the value of q may be varied depending on the triggering timing of the A-SRS.

Meanwhile, in case of DCI that includes an A-SRS triggering field of a 1-bit size, only one field value (for example, field value '1' triggered by actual A-SRS) may exist at the corresponding A-SRS triggering field, it is preferable that the implicit method such as the above method 1) is applied.

Alternatively, a separate operation such as the method 3) or 4) may be applied to each A-SRS triggering field existing at DCI. That is, the method 3) or 4) may be applied to each A-SRS triggering field within specific DCI or different kinds of DCI.

The method 3) or 4) may be applied to different kinds of DCI and at the same time may be applied to each field with respect to DCI having multiple triggering fields, whereby flexibility of the SRS transmission power in the network may be increased.

As described with reference to the aforementioned methods, in an environment that different inter-cell interference levels may exist per SF such as an environment to which the dynamic resource usage change is applied, SRS transmission power control of different levels may be applied to each subframe, whereby stable SRS reception may be performed.

The aforementioned A-SRS related transmission power control may be applied to periodic SRS, that is, P-SRS, and will be described as a separate embodiment.

<Third Embodiment>

First of all, in the third embodiment of the present invention, it is assumed that the base station provides a plurality of P-SRS configurations to the UE through RRC signaling.

In this case, in the third embodiment of the present invention, each P-SRS configuration is configured to interwork with a specific power control process, and in the power control process, each P-SRS may be applied/used equally to at least one of parameters such as $\{P_{O\_PUSCH,c}(i), \alpha_c(j), PL_c, f_c(i)\}$, or the corresponding parameter may finally be used by being partially modified by a specific function type. Each P-SRS configuration may be configured to follow an independent power control process.

That is, since a power control parameter set #1 (that is, power control subframe set #1) or a power control parameter set #2 (that is, power control subframe set #2) selectively interworks with P-SRS configuration, if the UE may receive single P-SRS configuration only, the UE may be operated to determine and transmit a power of the P-SRS by always using one PUSCH power control parameter set #p only.

In this case, the UE may be operated to determine and transmit the power of the P-SRS by using a power control parameter set only of the lowest index (or the highest index) with respect to the PUSCH power control parameter set #p. For example, if it is defined that the power control parameter set of the lowest index is always used in a state that indexes 0 to N are given to power control parameter sets, the UE may be operated to always determine and transmit the power of the A-SRS in accordance with the power control parameter set #1. In this case, it is advantageous in that RRC signaling information of corresponding P-SRS configuration may be reduced.

As a specific UE operation, the UE may be operated such that the PUSCH may use the power control parameter set #1 corresponding to the power control subframe set #1 at a specific subframe whereas the SRS uses the power control parameter set #2 corresponding to the power control subframe set #2 at the same subframe.

A specific power control process (for example, specific power control subframe set and power control related parameters) that may interwork for each P-SRS configuration and/or other parameters may be configured independently per P-SRS. At this time, the P-SRS period $T_{SRS}$ may not a cell-specific parameter any more. That is, $T_{SRS}$ may be UE-specific parameter, or may be configured at different values per P-SRS configuration. In this way, when two or more P-SRS configurations having different periods and/or different offsets are configured, a UE operation corresponding to a cases where P-SRS transmission timing points based on specific two or more P-SRS configurations are overlapped at a specific subframe may be determined to follow at least one of the following methods or the corresponding method may be configured by RRC signaling.

a) Parameters according to P-SRS configuration having the longest period and/or P-SRS to which a corresponding power control process is applied are transmitted, and P-SRS transmission according to the other P-SRS configuration is disregarded (that is, dropped). This is advantageous in that SRS transmission based on various P-SRS configurations may be performed uniformly as P-SRS having a long period has the highest priority and thus P-SRS having relatively short periods are dropped to be transmitted at next transmission timing point.

b) On the assumption that index is given to each P-SRS configuration, parameters according to P-SRS configuration having the lowest index (or the highest index) and/or P-SRS to which a corresponding power control process is applied are transmitted, and P-SRS transmission according to the other P-SRS configuration is disregarded.

c) Depending on a power control subframe set to which the current subframe belongs, specific P-SRS configuration parameters interworking with the corresponding power control subframe set and/or P-SRS to which a corresponding power control process is applied are transmitted, and P-SRS transmission according to the other P-SRS configuration is disregarded. That is, through this method, the UE may be operated such that RS transmission may be performed depending on whether the current subframe is a static subframe or a dynamic subframe.

d) Specific P-SRS configuration parameters interworking with a specific power control subframe set (for example, power control subframe set corresponding to a static subframe) which is always previously defined (or configured by RRC signaling) and/or P-SRS to which a corresponding power control process is applied are transmitted, and P-SRS transmission according to the other P-SRS configuration is disregarded.

e) Finally, P-SRS transmission at the corresponding subframe may be disregarded. However, if A-SRS transmission should be performed at the corresponding subframe, it is preferable that A-SRS is transmitted.

It will be apparent that the above a) to e) methods may be applied by combination. In this case, the method having a priority for application may be defined. As a main example, the methods a) and b) may be applied. At this time, if the method a) is first applied and a plurality of P-SRS configurations having a corresponding long period have the same period, SRS according to P-SRS configuration having a relatively low (or high) index may only be transmitted, and the other P-SRSs may all be dropped.

As another example, the methods c) and b) may be applied. At this time, if the method c) is first applied and two or more P-SRS configurations interwork with a specific power control subframe set to which the current frame belongs, SRS according to P-SRS configuration having a relatively low (or high) index may only be transmitted, and the other P-SRSs may all be dropped.

As still another example, the methods may be operated in accordance with a priority of a)→c)→b). That is, if two or more P-SRS configurations having the longest period are selected and there is P-SRS configuration interworking with a specific power control subframe set to which the current frame belongs, SRS according to the corresponding P-SRS is transmitted. At this time, if a plurality of corresponding P-SRS configurations are provided, SRS transmission may be performed in accordance with the P-SRS configuration having the lowest (or highest) index.

Alternatively, a priority of application in the order of c)→a)→b) may be determined and a power control subframe set to which the current frame belongs is first identified. If two or more P-SRS configurations corresponding to the power control subframe set to which the current subframe belongs are provided, P-SRS configuration having a longer period is identified. If there are still two P-SRS configurations corresponding to the above condition, SRS transmission may be performed in accordance with the P-SRS configuration having the lowest (or highest) index.

<Fourth Embodiment>

First of all, in the fourth embodiment of the present invention, it is assumed that the base station provides one P-SRS configuration to the UE through RRC signaling.

The base station may transmit specific SRS configuration parameters previously interworking with a corresponding power control subframe set in accordance with a power control subframe set to which a subframe for SRS transmission belongs and/or P-SRS according to a corresponding power control process in accordance with P-SRS configuration. That is, the base station may be operated to perform SRS transmission to which different SRS related parameters and/or transmission power control is applied depending on whether the current SRS transmission SF is the static subframe or the dynamic subframe.

According to this method, at least one of power control related parameters {$P_{CMAX,c}(i)$, $P_{SRS\_OFFSET,c}(m)$, $M_{SRS,c}$, $P_{O\_PUSCH,c}(j)$, $\alpha_c(j)$, $PL_C$, $f_c(i)$} of the corresponding SRS may be varied depending on a type of a transmission subframe of the SRS.

For example, P-SRS may be transmitted may be applied/used equally to at least one of parameters such as {$P_{O\_PUSCH,c}(j)$, $\alpha_c(j)$, $PL_C$, $f_c(i)$} interworking with a corresponding power control subframe set in accordance with a type of a power control subframe set to which the current subframe belongs, or may be transmitted such that the corresponding parameter may finally be used by being partially modified by a specific function type.

In conclusion, information which should be used for power control in PSRS configuration may be provided as one type of the followings by RRC signaling:

i) power control parameters associated with PUSCH at a subframe to which P-SRS is transmitted;

ii) power control parameter set #1 (that is, power control subframe set #1); and iii) power control parameter set #2 (that is, power control subframe set #2).

If power control parameter sets more than 2 may be configured, it will be apparent that an option such as a power control parameter set #3 may be provided additionally.

In the aforementioned embodiments, it will be apparent that basic restriction may be given that a subframe for actually transmitting SRS should perform SRS transmission only in case of an uplink subframe (and/or special subframe) in accordance with dynamic resource usage change.

<Fifth Embodiment>

Although a P-SRS minimum period in the TDD system is 2 ms as illustrated in Table 8 above, for more flexible usage of P-SRS configuration, the fifth embodiment of the present invention suggests that a P-SRS minimum period is 1ms as illustrated in Table 14 below.

More values may be designated for a factor $T_{offset}$ for determining an SRS transmission timing point as illustrated in Table 14 below as compared with a period of 2 ms. Table 14 is only exemplary, and it is to be understood that modifications that may increase flexibility of P-SRS configuration are included in spirits of the present invention.

TABLE 14

| SRS Configuration Index $I_{SRS}$ | SRS Periodicity $T_{SRS}$ (ms) | SRS Subframe Offset $T_{offset}$ |
|---|---|---|
| Reference_Index + 0 | 1 | 0, 1, 2 |
| Reference_Index + 1 | 1 | 0, 1, 3 |
| Reference_Index + 2 | 1 | 0, 1, 4 |
| Reference_Index + 3 | 1 | 0, 2, 3 |
| Reference_Index + 4 | 1 | 0, 2, 4 |
| Reference_Index + 5 | 1 | 0, 3, 4 |
| Reference_Index + 6 | 1 | 1, 2, 3 |
| Reference_Index + 7 | 1 | 1, 2, 4 |
| Reference_Index + 8 | 1 | 1, 3, 4 |
| Reference_Index + 9 | 1 | 2, 3, 4 |
| Reference_Index + 10 | 1 | 0, 1, 2, 3 |
| Reference_Index + 11 | 1 | 0, 1, 2, 4 |
| Reference_Index + 12 | 1 | 0, 1, 3, 4 |
| Reference_Index + 13 | 1 | 0, 2, 3, 4 |
| Reference_Index + 14 | 1 | 1, 2, 3, 4 |

As an management example in view of an overall network, in a state that two or more P-SRSs to which different SRS power control processes according to a plurality of P-SRS configurations are applied are configured to be transmitted periodically (for example, P-SRS configuration for PUSCH scheduling at each of the static subframe and the flexible subframe), a received power level to the base station through P-SRS transmission according to different P-SRS configurations may be used to be identified by the base station.

At this time, if it is sensed that receiving sensitivity of SRS to which a specific P-SRS configuration is applied is higher or lower than an average estimated value as much as a specific level or more (or for more accurate frequency selective scheduling), the base station may trigger A-SRS according to a specific power control process to allow the UE to perform aperiodic transmission for a specific A-SRS only in accordance with a request of the base station. This method may be used to enable active frequency selective scheduling and link adaptation even in a state that dynamic resource usage change is generated.

<Sixth Embodiment>

If PUSCH should be transmitted to a subframe to which SRS is transmitted, the UE may be configured to transmit both the PUSCH and the SRS to the same subframe. In this case, as UE operation corresponding to a case where power control processes of the PUSCH and the SRS are different from each other or there is a difference in a transmission power between the PUSCH and the SRS as much as a specific level or more due to a great transmission power offset value, it is suggested that at least one of the following methods is determined or the corresponding method is configured by RRC signaling.

(A) If the difference in a transmission power between the PUSCH and the SKS, which should be transmitted to the corresponding subframe, is more than a predetermined value or a value provided by RRC signaling, the UE transmits one of the PUSCH and the SKS and drops the other one. Alternatively, if the PUSCH which is data information should be transmitted without uplink control information, the UE may drop the PUSCH and transmit the SRS only. On the other hand, if the PUSCH should be transmitted together with uplink control information, for example, if PUCCH is subjected to piggyback to the PUSCH, the UE may drop the SRS and transmit the corresponding PUSCH only.

B) If the UE should transmit the PUCCH and the SRS to the specific subframe at the same time and a difference in a transmission power between the PUCCH and the SRS is more than a predetermined value or a value provided by RRC signaling, the UE transmits only one of the PUCCH and the SRS and drops the other one.

C) If the UE should transmit the PUSCH and the PUCCH and the SRS to the specific subframe at the same time and a difference in a transmission power between the SRS and the PUSCH or the PUCCH is more than a predetermined value or a value provided by RRC signaling, the UE drops transmission of the corresponding SRS (or PUSCH and PUCCH) and transmits the PUSCH and the PUCCH only (or SRS only).

D) Alternatively, only if the corresponding SRS interworks with a specific power control subframe set (for example, static subframe), the UE may transmit the SRS and drop other uplink transmission, or vice versa.

In the above examples of A) to D), the difference value in the corresponding transmission power (and/or information of dropping) may be reported to the base station. Reporting of the difference value in the corresponding transmission power may be defined to be transmitted by being included in the PUSCH through a specific format of data payload of the PUSCH transmitted from the corresponding subframe (or transmitted by initial uplink grant). Otherwise, the difference value in the corresponding transmission power may be reported by being included in a PUSCH PHR (power headroom report) or may be reported by interworking with the PUSCH PHR together with a corresponding event when the corresponding event occurs. Otherwise, the difference value in the corresponding transmission power may separately be reported periodically, or may be reported non-periodically when a corresponding event occurs.

<Seventh Embodiment>

In the seventh embodiment of the present invention, a method for determining $N_{symb}^{PUSCH}$ (or $N_{symb}^{PUSCH-initial}$)

indicating the number of symbols into which PUSCH is mapped when a UE desires to transmit the PUSCH will be described.

Figure 9:
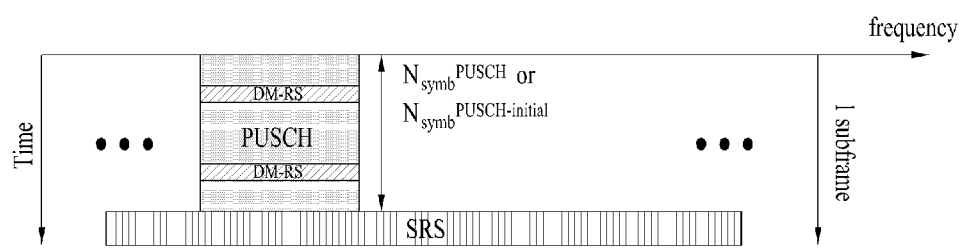
FIG. 9 is a diagram illustrating a method for determining the number of symbols into which a PUSCH is mapped.

FIG. 9 is a diagram illustrating a method for determining the number of symbols into which a PUSCH is mapped.

Referring to FIG. 9, determining a value of Nsymb-PUSCH is affected by a value of NSRS according to cell specific SRS configuration. At this time, when a current frame to which the UE desires to transmit the PUSCH is the same as a subframe to which SRS may be transmitted cell-specifically, NSRS=1 may be configured, and at this time, the subframe to which SRS may be transmitted cell-specifically may be given by RRC signaling which is a higher layer signal.

In other words, when one cell specific SRS configuration RRC signals to UEs within a cell and the UEs within the cell desire to transmit a PUSCH, the UEs identify whether a corresponding PUSCH transmission subframe is overlapped with the cell specific SRS subframe. If the corresponding PUSCH transmission subframe is overlapped with the cell specific SRS subframe, the UEs apply rate matching such that PUSCH data mapping is not performed at the last symbol (that is, symbol to which SRS may be transmitted) of the corresponding subframe. In this case, since the PUSCH transmitted from the UE is generally towards eNB of a serving cell, the eNB of the serving cell is configured to be operated based on cell specific SRS configuration only.

However, if a plurality of P-SRS configurations are applied to a specific UE like the present invention, the plurality of P-SRS configurations per UE are reflected by the cell specific SRS subframe configuration, whereby a problem occurs in that the subframe indicated by the cell specific SRS subframe configuration may be too great. That is, rate mapping of the last SC-FDMA symbol during PUSCH transmission is frequently generated such that a plurality of subframes may be included in the cell specific SRS subframe configuration, whereby a problem occurs in that throughput may be reduced. To solve the problem, in the seventh embodiment of the present invention, SRS subframe configuration may be configured UE-specifically not cell-specifically, and a plurality of UE specific SRS subframe configurations may be configured for a specific UE.

In other words, the UE may receive a plurality of UE specific SRS subframe configurations through UE specific RRC signaling, and may consider methods (X) and (Y), as follows, as to which UE specific SRS subframe configuration may be applied to perform PUSCH rate matching when transmitting a PUSCH in accordance with an uplink grant.

(X) The corresponding UE performs PUSCH rate matching at subframes obtained by union of the plurality of UE specific SRS subframe configurations which are RRC configured.

(Y) The corresponding UE may be indicated dynamically as to whether PUSCH rate matching is performed at subframes according to a corresponding UE specific SRS subframe configuration through specific DCI in a corresponding uplink grant. At this time, the method of (X) may be applied, whereby the corresponding UE may be indicated dynamically as to whether PUSCH rate matching is performed at subframes obtained by union for all (or some) of the plurality of UE specific SRS subframe configurations which are RRC configured. The portion corresponding to union for some of SRS subframe configurations may be configured previously by RRC signaling as configuration for a specific field of corresponding DCI.

Additionally, when the base station RRC signals a plurality of UE specific SRS subframe configurations to a specific UE, some restriction may be given that subframes obtained by union for the SRS subframe configurations configured for the corresponding UE should be configured to be included in a subframe set indicated by a cell specific SRS subframe configuration applied by legacy UEs at a corresponding cell. Alternatively, if the UE receives SRS subframe configurations that do not fulfill the restriction, the UE may be operated to perform PUSCH rate matching in accordance with the same cell specific SRS subframe configurations as those of the legacy UEs by disregarding the received SRS subframe configurations.

Figure 10:
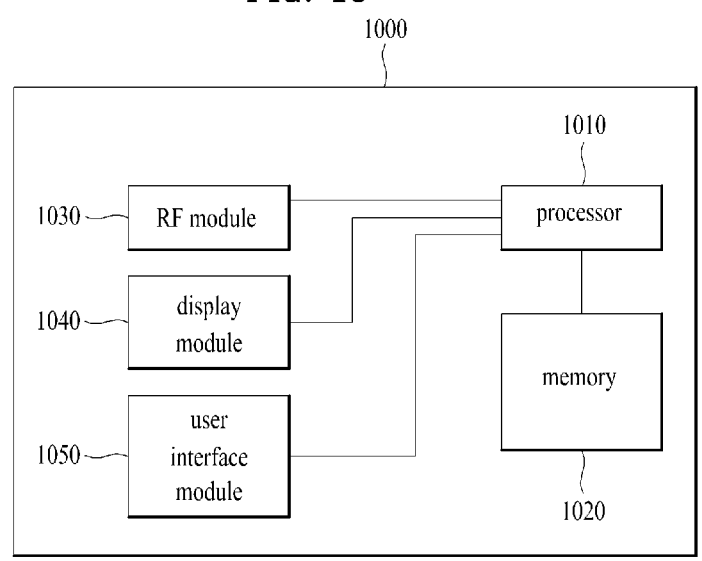
FIG. 10 is a block diagram illustrating a communication apparatus according to one embodiment of the present invention.

FIG. 10 is a block diagram illustrating a communication apparatus according to one embodiment of the present invention.

Referring to FIG. 10, the communication apparatus, denoted by reference numeral 1000, includes a processor 1010, a memory 1020, a radio frequency (RF) module 1030, a display module 1040, and a user interface module 1050.

The communication apparatus 1000 is illustrated for convenience of description and some of modules thereof may be omitted. In addition, the communication apparatus 1000 may further include necessary modules. Moreover, some modules of the communication apparatus 1000 may be divided into segmented modules. The processor 1010 is configured to perform the operations according to embodiments of the present invention illustrated with reference to the drawings. Specifically, descriptions of FIGS. 1 to 10 may be referred to for a detailed operation of the processor 1010.

The memory 1020 is connected with the processor 1010 and stores an operating system, an application, program code, data, etc. therein. The RF module 1030 is connected to the processor 1010 and converts a baseband signal into a radio signal or vice versa. To achieve this, the RF module 1030 performs analog conversion, amplification, filtering and frequency uplink conversion, or performs reverse processes thereof. The display module 1040 is connected to the processor 1010 and displays various types of information. Examples of the display module 1040 include, but are not limited to, a liquid crystal display (LCD), a light emitting diode (LED), and an organic light emitting diode (OLED). The user interface module 950 is connected to the processor 910 and may be configured by a combination of well known user interfaces such as a keypad and a touch screen.

The aforementioned embodiments are achieved by a combination of structural elements and features of the present invention in a predetermined manner. Each of the structural elements or features should be considered selectively unless otherwise specified. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. It will be apparent that some claims not explicitly referring to one another may be combined to constitute an embodiment or to be included as a new claim by means of amendment after the application is filed.

The embodiments according to the present invention may be implemented by various means, for example, hardware, firmware, software, or a combination thereof. If an embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If an embodiment according to the present invention is implemented by firmware or software, the embodiment of the present invention may be implemented by a type of a module, a procedure, or a function, which performs functions or operations as described above. Software code may be stored in a memory unit and then driven by a processor. The memory unit may be located inside or outside the processor to transmit and receive data to and from the processor through various well-known means.

It will be apparent to those skilled in the art that the present invention may be embodied in other specific forms without departing from characteristics of the invention. Thus, the descriptions are to be considered in all respects as illustrative and not restrictive. The scope of the invention should be determined by reasonable interpretation of the appended claims and all change which comes within the equivalent scope of the invention are within the scope of the invention.

INDUSTRIAL APPLICABILITY

The method for controlling an uplink transmission power in a wireless communication system and an apparatus therefor have been described based on an example in which the method and apparatus are applied to a 3rd generation partnership project long term evolution (3GPP LTE) system. However, the method and the apparatus are applicable to various wireless communication systems in addition to the 3GPP LTE system.

The invention claimed is:

1. A method for enabling a user equipment to transmit a sounding reference signal (SRS) to a base station in a wireless communication system, the method comprising:
   receiving, by the user equipment, information about a first subframe set and a second subframe set through a higher layer from the base station,
   wherein each of the first subframe set and the second subframe set is configured by the user equipment;
   receiving, by the user equipment, a triggering indicator of the SRS from the base station; and
   transmitting, by the user equipment, the SRS to the base station at a specific subframe in accordance with the triggering indicator,
   wherein each of the first subframe set and the second subframe set is associated with a power control process for uplink data channel transmission and a power control process of the SRS,
   wherein the power control process of the SRS is configured based on a bit size and a field value of the triggering indicator,
   wherein a transmission power of the SRS is determined based on the power control process of the SRS, and
   wherein when the bit size of the triggering indicator is 2 bits or more and the field value is 1, the transmission power of the SRS is determined based on a power control process associated with one of the first subframe set and the second subframe set, to which the specific subframe belongs.

2. The method according to claim 1, wherein the first subframe set is a set of subframes fixed for an uplink, and the second subframe set is a set of subframes that may be used for one of an uplink and a downlink in accordance with an indication of the base station.

3. A method for enabling a base station to receive a sounding reference signal (SRS) from a user equipment in a wireless communication system, the method comprising:
   transmitting, by the base station, information about a first subframe set and a second subframe set through a higher layer from the user equipment,
   wherein each of the first subframe set and the second subframe set is configured by the user equipment;
   transmitting, by the base station, a triggering indicator of the SRS to the user equipment; and
   receiving, by the base station, the SRS at a specific subframe from the user equipment,
   wherein each of the first subframe set and the second subframe set is associated with a power control process for uplink data channel transmission and a power control process of the SRS,
   wherein the power control process of the SRS is configured based on a bit size and afield value of the triggering indicator,
   Wherein a transmission power of the SRS is determined based on the power control process of the SRS, and
   wherein when the bit size of the triggering indicator is 2 bits or more and the field value is 1, the transmission power of the SRS is determined based on a power control process associated with one of the first subframe set and the second subframe set, to which the specific subframe belongs.

4. The method according to claim 3, wherein the first subframe set is a set of subframes fixed for an uplink, and the second subframe set is a set of subframes that may be used for one of an uplink and a downlink in accordance with an indication of the base station.

* * * * *